(12) United States Patent
Behmke et al.

(10) Patent No.: US 11,796,157 B2
(45) Date of Patent: Oct. 24, 2023

(54) INTERCHANGEABLE SHADOW MAKING FLASHLIGHT SYSTEM

(71) Applicants: Chase A. Behmke, Boston, MA (US); James M. Behmke, Boston, MA (US)

(72) Inventors: Chase A. Behmke, Boston, MA (US); James M. Behmke, Boston, MA (US)

(*) Notice: Subject to any disclaimer, the term of this patent is extended or adjusted under 35 U.S.C. 154(b) by 0 days.

(21) Appl. No.: 18/071,580

(22) Filed: Nov. 29, 2022

(65) Prior Publication Data
US 2023/0220976 A1  Jul. 13, 2023

Related U.S. Application Data

(60) Provisional application No. 63/283,856, filed on Nov. 29, 2021.

(51) Int. Cl.
F21V 11/08 (2006.01)
F21V 23/04 (2006.01)
(Continued)

(52) U.S. Cl.
CPC ............. *F21V 11/08* (2013.01); *F21L 4/005* (2013.01); *F21V 23/04* (2013.01); *F21Y 2115/10* (2016.08)

(58) Field of Classification Search
CPC .......... F21V 11/08; F21V 23/04; F21L 4/005; F21Y 2115/10
See application file for complete search history.

(56) References Cited

U.S. PATENT DOCUMENTS 3,401,596 A * 9/1968 Hirsch ............... F21L 4/00
362/310
5,233,375 A * 8/1993 Williams ............... G09F 19/18
353/43
(Continued)

FOREIGN PATENT DOCUMENTS

CN  201049215 Y  4/2008
CN  202802784 U  3/2013
(Continued)

OTHER PUBLICATIONS

Google Patents English translation for CN203142253U.
(Continued)

*Primary Examiner* — Evan P Dzierzynski
(74) *Attorney, Agent, or Firm* — BEHMKE INNOVATION GROUP LLC; James M. Behmke; James J. Wong

(57) ABSTRACT

An interchangeable shadow making flashlight system herein may comprise a flashlight with an extended tube on the light-emitting end having a fastening mechanism to receive interchangeable shadow-producing cover sheets with at least first and second portions (e.g., opaque/transparent/semi-transparent portions) configured in specific shapes, such that light passing through the tube is affected differently by the respective portions to create a corresponding shadow/image on a receiving projection surface. The flashlight preferably comprises a single light source, such as a light emitting diode, and no reflector, to ensure a single non-refracting beam of light through the tube, such that the resultant shadow/image is crisply made on the projection surface. Also, the length of the tube may be configured specifically to place the shadow-producing cover sheets at an optimal focal length from the light source in order to further create
(Continued)

a crisp outline of the produced shadow. Other embodiments are also described herein.

18 Claims, 13 Drawing Sheets

(51) Int. Cl.
*F21L 4/00* (2006.01)
*F21Y 115/10* (2016.01)

(56) References Cited

U.S. PATENT DOCUMENTS

| | | | | |
|---|---|---|---|---|
| 5,517,264 | A * | 5/1996 | Sutton | F21S 8/035 353/71 |
| 5,934,223 | A * | 8/1999 | Ellery-Guy | A01K 15/025 362/811 |
| 6,623,124 | B2 * | 9/2003 | Okura | G03B 21/001 353/101 |
| 7,909,468 | B2 * | 3/2011 | Lloyd | G03B 21/06 353/50 |
| 8,684,557 | B2 * | 4/2014 | Totani | F21V 17/002 362/249.02 |
| 11,011,067 | B2 * | 5/2021 | Lee | G09B 5/067 |
| 2015/0300598 | A1 * | 10/2015 | Brunt, Jr. | B29C 67/246 362/296.02 |

FOREIGN PATENT DOCUMENTS

| | | |
|---|---|---|
| CN | 203142253 U | 8/2013 |
| CN | 203899162 U | 10/2014 |
| CN | 104266106 A | 1/2015 |
| CN | 108534796 A | 9/2018 |
| CN | 209790880 U | 12/2019 |
| CN | 210251235 U | 4/2020 |
| CN | 210637871 U | 5/2020 |
| CN | 211146311 U | 7/2020 |
| CN | 212090912 U | 12/2020 |
| CN | 212408388 U | 1/2021 |
| CN | 212594020 U | 2/2021 |
| CN | 213609817 U | 7/2021 |
| CN | 214284269 U | 9/2021 |
| JP | 3231785 U | 4/2021 |
| KR | 200406881 Y1 | 1/2006 |
| KR | 200424883 Y1 | 8/2006 |
| KR | 20170029760 A | 3/2017 |
| KR | 200487225 Y1 | 8/2018 |
| KR | 102090536 B1 | 3/2020 |

OTHER PUBLICATIONS

Google Patents English translation for CN203899162U.
Google Patents English translation for KR200406881Y1.
Google Patents English translation for CN104266106A.
Google Patents English translation for KR200424883Y1.
Google Patents English translation for CN209790880U.
Google Patents English translation for CN210251235U.
Google Patents English translation for CN213609817U.
Google Patents English translation for KR200487225Y1.
Google Patents English translation for CN212594020U.
Google Patents English translation for JP3231785U.
Google Patents English translation for CN212408388U.
Google Patents English translation for KR102090536B1.
Google Patents English translation for CN210637871U.
Google Patents English translation for KR20170029760A.
Google Patents English translation for CN201049215Y.
Google Patents English translation for CN212090912U.
Google Patents English translation for CN214284269U.
Google Patents English translation for CN202802784U.
Google Patents English translation for CN211146311U.
Google Patents English translation for CN108534796A.

* cited by examiner

INTERCHANGEABLE SHADOW MAKING FLASHLIGHT SYSTEM

RELATED APPLICATION

This application claims priority to U.S. Prov. Appl. Ser. No. 63/283,856, filed Nov. 29, 2021, entitled INTERCHANGEABLE SHADOW MAKING FLASHLIGHT SYSTEM, by Chase A. Behmke, et al., the contents of which are incorporated herein by reference.

TECHNICAL FIELD

The present disclosure relates generally to shadow making, and, more particularly, to an interchangeable shadow making flashlight system.

BACKGROUND

Shadow puppets have provided fun and entertainment for the young and old for thousands of years, having been created and adapted throughout most cultures in history. Typically, shadow puppets are made by placing hands, fingers, etc., in front of a light source (e.g., flashlight, lamp, sun, etc.) and configured in various shapes to block out a portion of the light rays to create a desired shadow image, such as a dog, a bird, a snake, and so on. Other shadow art in history has been based on placing opaque (light-blocking) material or paint on an otherwise translucent (light-passing) lampshade to project the lamp's light rays through only a portion of the lampshade, resulting in various art or objects appearing in shadow form on surrounding walls.

Shadow puppetry, however, is often difficult for most people, especially for young children. For example, manipulating their fingers, particularly into meaningful shapes, and understanding where to place their hands with relation to the beam of light, can be difficult for most kids (and many adults). Also, the shapes possible with human hands are limited, and the fun only lasts so long.

SUMMARY

The techniques herein are directed generally to an interchangeable shadow making flashlight system. Specifically, in one embodiment, a flashlight is configured with an extended tube on the light-emitting end, where the tube has a fastening mechanism at the end to receive any of a plurality of interchangeable shadow-producing cover sheets having at least first and second portions, such as an opaque portion, a transparent portion, and/or a semitransparent portion configured in specific shapes, such that light passing through the tube is affected differently by the respective portions (e.g., blocked by the opaque portion) to create a corresponding shadow/image on a receiving projection surface (e.g., a wall or ceiling). The flashlight preferably comprises a single light source, such as a light emitting diode, and no reflector, to ensure a single non-refracting beam of light through the tube, such that the resultant shadow/image is crisply made on the projection surface. Also, the length of the tube may be configured specifically to place the shadow-producing cover sheets at an optimal focal length from the light source in order to further create a crisp outline of the produced shadow, as well as to prevent/limit enlarging of the produced shadow based on distance to the receiving projection surface.

In one embodiment, the interchangeable shadow-producing cover sheets may comprise a transparent portion (or semitransparent portion) surrounding an opaque portion (or semitransparent portion) to produce a dark(er) object within a light(er) outer beam of light. In another embodiment, the interchangeable shadow-producing cover sheets may comprise an opaque portion (or semitransparent portion) surrounding a transparent portion (or semitransparent portion) to produce a light(er) object alone (or within a darker/colored outer beam of light).

In one embodiment, the interchangeable shadow-producing cover sheets may comprise one or more colored portions, such as to create colored shadows, as opposed to (or in addition to) dark shadows produced by opaque portions. The colored portions may be used with opaque portions to create a dark object within a colored light, or with transparent portions to create a colored object within a white light. Various other combinations are also possible.

In one embodiment, the flashlight may have a stand base to allow the flashlight to free-stand on a horizontal surface, such as a nightstand, dresser, etc.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

As noted above, shadow puppetry is often difficult for most people, especially for young children, and the options are extremely limited.

The interchangeable shadow making flashlight system according to the present disclosure, therefore, provides an unlimited number of unique, easy-to-create shadows in a handheld device.

Figure 1:
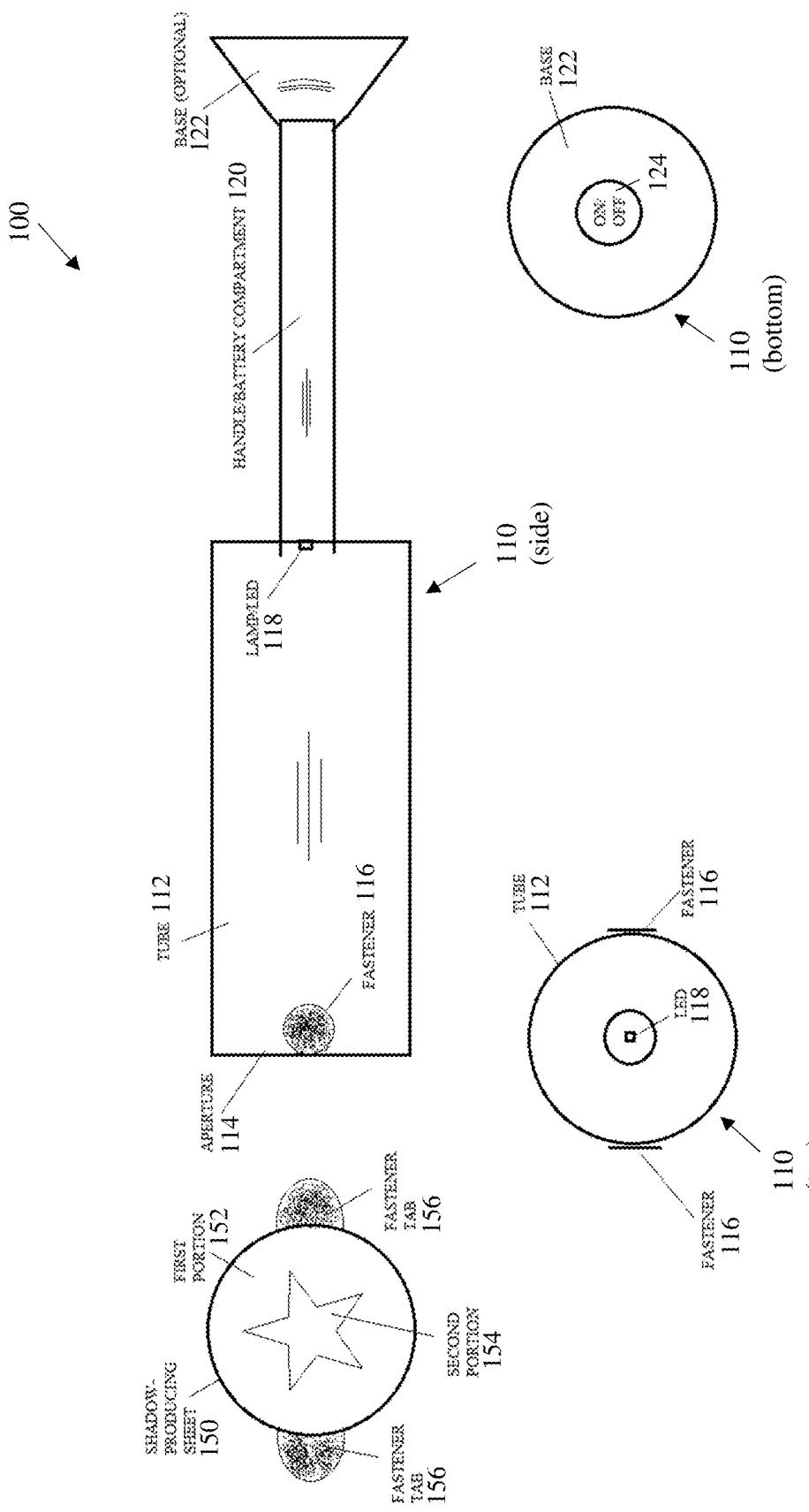
FIG. 1 illustrates an example of an interchangeable shadow making flashlight system in accordance with one or more embodiments of the present disclosure.

FIG. 1 illustrates an example of an interchangeable shadow making flashlight system 100 in accordance with one or more embodiments of the present disclosure. For example, in one embodiment, a flashlight 110 is configured with an extended tube 112 on the light-emitting end, where the tube has an aperture 114 and a fastening mechanism 116 at the aperture end (distal to a lamp/light source 118) to receive any of a plurality of interchangeable shadow-producing cover sheets 150 having at least a first portion 152 and a second portion 154 (e.g., to define a shape such as a star as shown), such as an opaque portion, a transparent portion, and/or a semitransparent portion configured in specific shapes, such that light passing through the tube is affected differently by the respective portions (e.g., blocked by the opaque portion) to create a corresponding shadow/image on a receiving projection surface (e.g., a wall or ceiling). Fasteners 156 may be hook and loop (e.g., VEL-CRO®), snaps, buttons, magnets, slots, compressive fits, and so on. In an alternative embodiment, a threaded cap system may also be used (e.g., screwing on the cover sheet) as the fasteners, respectively.

The flashlight 110 preferably comprises a single light source/lamp 118, such as a light emitting diode (LED), and no reflector/reflective cup, to ensure a single non-refracting beam of light through the tube 112, such that the resultant shadow/image is crisply made on the projection surface. Example LEDs may include LED chips, opto-semiconductor LEDs, etc., and may or may not require a regulator micro-control unit. Optionally, a glass or silicon covering may be placed over the LED, but preferably with negligible reflection/refraction properties. The light source/LED may be powered by a power source such as one or more batteries (e.g., standard, rechargeable, etc.), illustratively contained within the handle/battery compartment 120 of the flashlight 110.

Note that the length of the tube 112 may be configured specifically to place the shadow-producing cover sheets 150 at an optimal focal length from the light source 118 in order to further create a crisp outline of the produced shadow. Through experimentation, it was found that approximately 4.5-5.5 inches was suitable, though other ranges may result from different configurations of the light source or other factors, accordingly (e.g., 2.5-7.5 inches). The extended tube 112 may be a generally non-reflective material, such as a dark plastic or metal, and while shown as a cylinder, may be any suitable shape (with a resultant change in the outline of the emitted light, accordingly). Illustratively, the diameter of an example tube is approximately 2⅝ inches, though other measurements are suitable (e.g., anywhere from 1-4 inches).

In addition to the optimal focal length, the length of the tube 112 also focuses the produced shadow onto the receiving projection surface in a manner that limits the light spread of the resultant beam of light. That is, depending on the beam angle of the light source, the distance between the light source and the receiving projection surface would typically result in a beam spread/diameter that is based on the distance, i.e., further away from a surface results in a larger beam diameter than being closer to the surface. According to the techniques herein, therefore, in order to maintain substantially the same size of the projected shadow on the receiving projection surface, the length of the tube also produces a beam spread limiting effect. In this manner, by having the length of tube between the light source 118 and the shadow-producing cover sheets 150, as opposed to having the shadow-producing cover sheets located on the end of the tube proximal to the light source, also ensures that the light beam spread has already occurred to its maximum allowed distance prior to encountering the shadow-producing cover sheet, further ensuring crisp shadow edges on a projected shadow on the receiving projection surface that is not vastly different regardless of how far away the surface is located. Accordingly, a plane shadow, for example, is substantially the same size on a near wall, a ceiling, or a far wall of a bedroom, creating more realistic play that is manageable to a child without worrying about distortion, distances, multi-flashlight play from different locations in the same room, and so on.

In one embodiment, the flashlight 110 may have a stand base 122 to allow the flashlight to free-stand on a horizontal surface, such as a nightstand, dresser, etc. As shown, the base is a conical design with a base diameter approximately equal to the diameter of the tube 112, though other shapes and sizes are possible. The base 122 also illustratively houses an on/off switch 124 (e.g., a press switch) to be out of the way of the handle 120, but other locations of the switch are possible. The stand base (or the tube) may also have one or more features that prevent rolling, such as flat portions, bumps, etc.

Figure 2A:
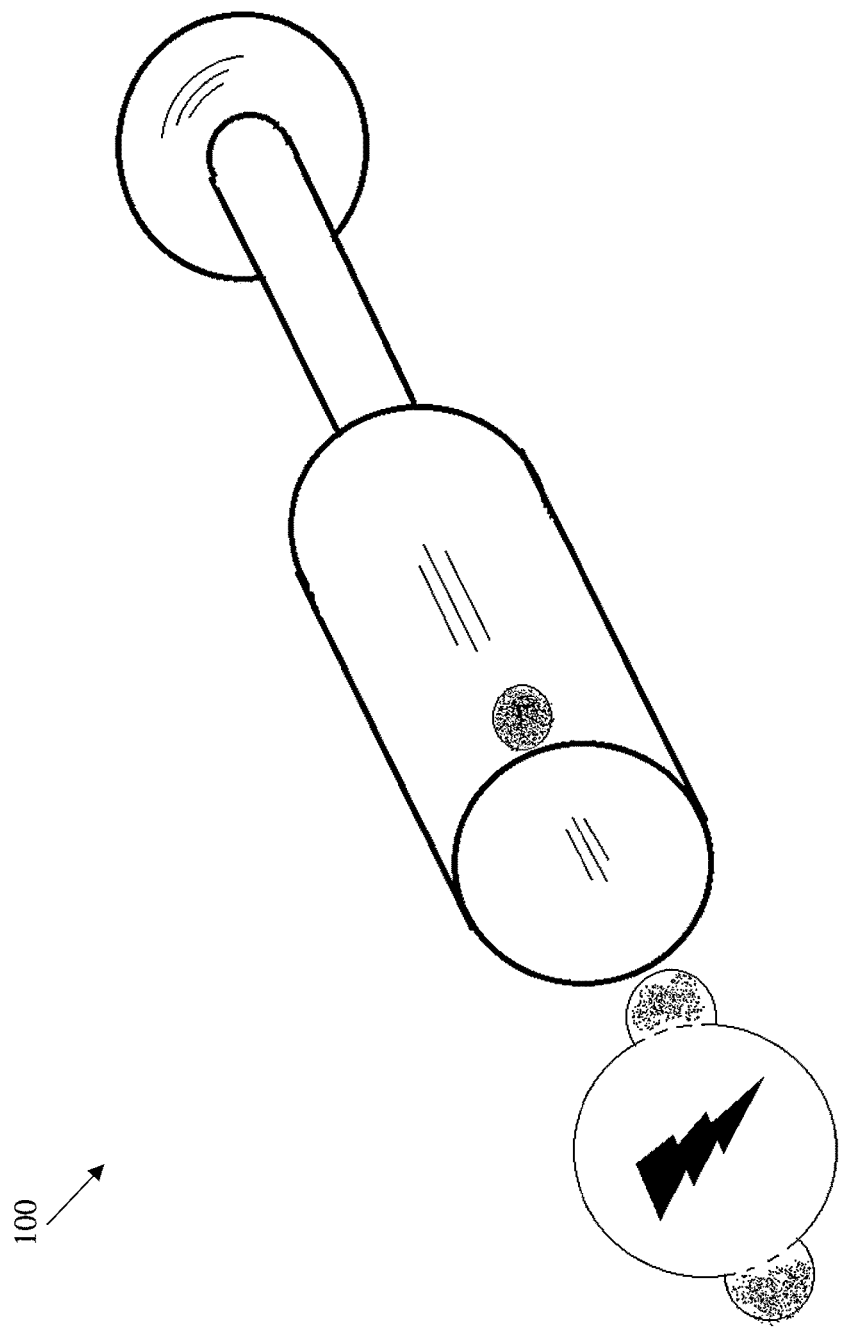
FIGS. 2A-2B illustrate an example of assembling the interchangeable shadow making flashlight system in accordance with one or more embodiments of the present disclosure.
Figure 2B:
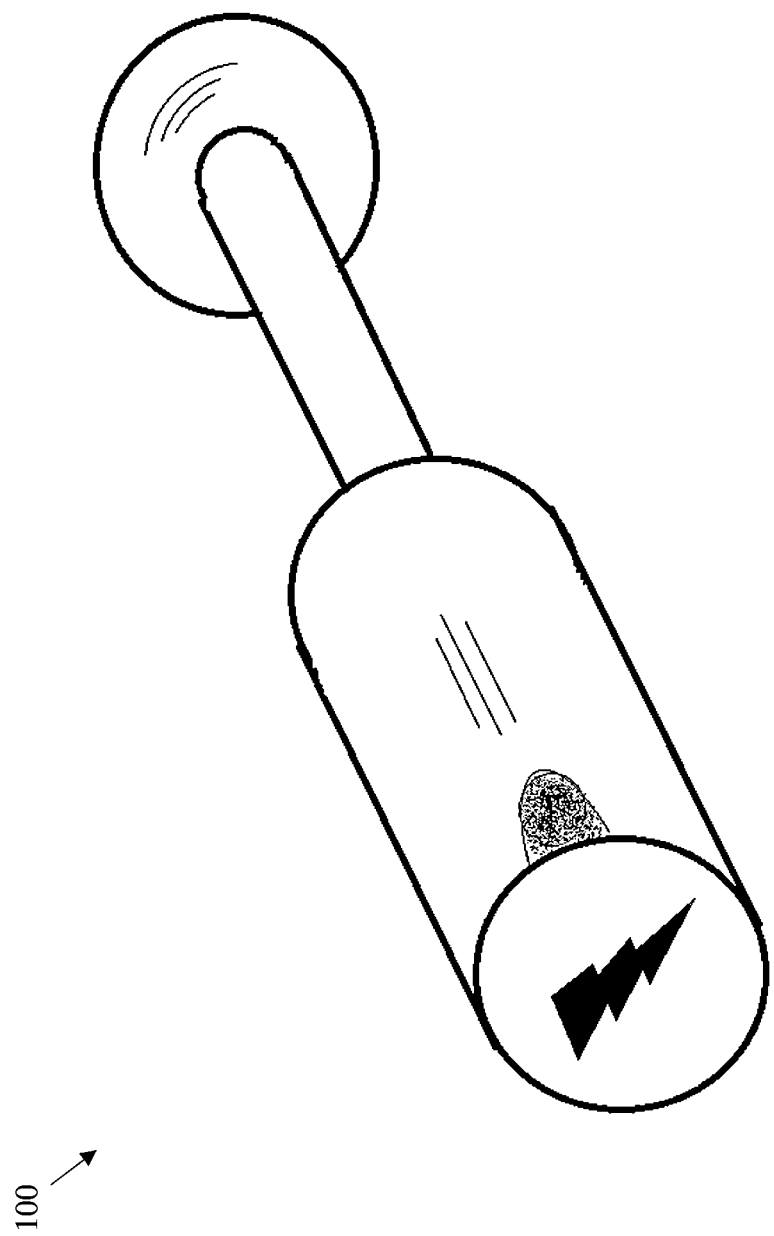
Figure 2C:
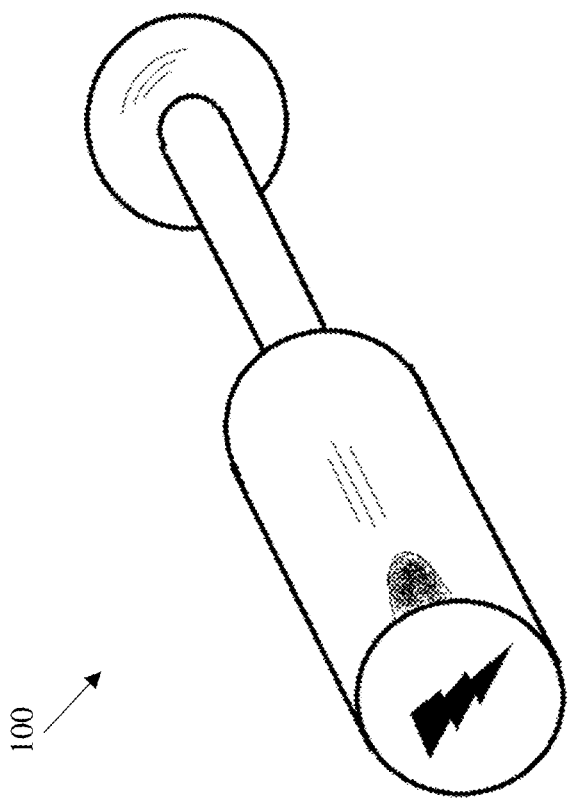
FIG. 2C illustrates an example of operating the interchangeable shadow making flashlight system in accordance with one or more embodiments of the present disclosure.
Figure 2C:
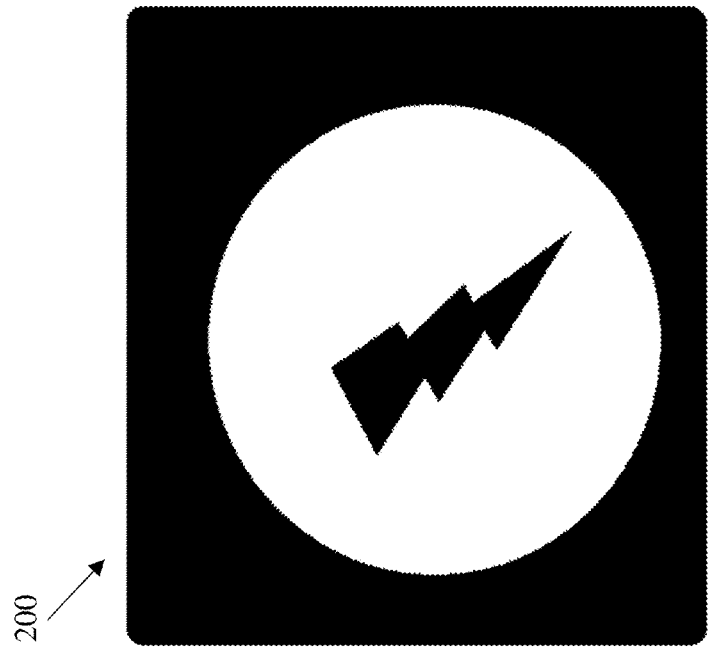

FIGS. 2A-2B illustrate an example of assembling the interchangeable shadow making flashlight system 100 in accordance with one or more embodiments of the present disclosure. In particular, an example sheet (150) comprises an opaque lightning bolt (e.g., paper/plastic, such as black or otherwise opaque) on a transparent sheet (e.g., clear plastic, glass, etc.), which can be placed on the end of the tube using the corresponding fasteners. FIG. 2C then illustrates an example of operating the interchangeable shadow making flashlight system in accordance with one or more embodiments of the present disclosure, notably showing a lightning bolt shadow on a projection surface (e.g., wall, ceiling, floor, etc.), generally referenced herein as a "produced shadow" 200 (i.e., a combination of the emitted light, the shadows of the emitted light, and/or the receiving projection surface, accordingly).

Figure 3:
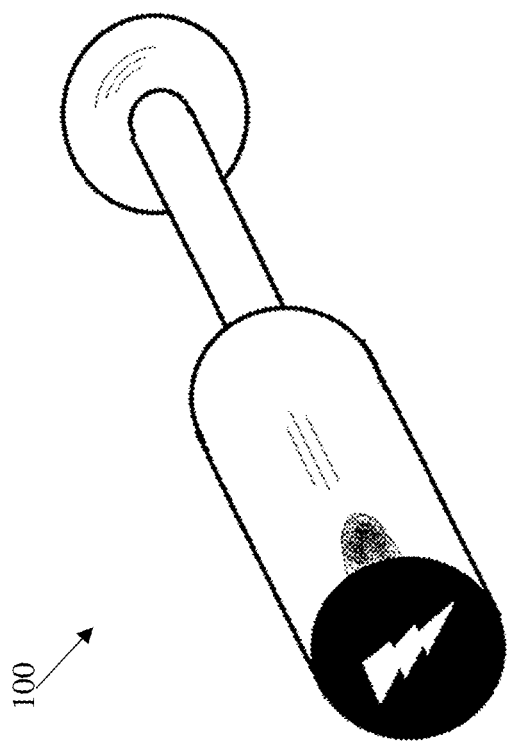
FIG. 3 illustrates an example of a transposed shadow in accordance with one or more embodiments of the present disclosure.
Figure 3:
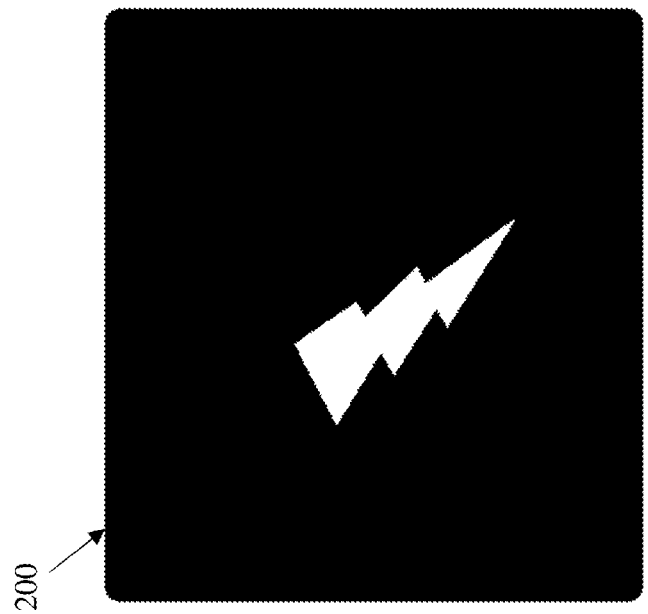

Note that in one embodiment, the interchangeable shadow-producing cover sheets 150 may comprise a transparent portion (or semitransparent portion) surrounding an opaque portion (or semitransparent portion) to produce a dark(er) object within a light(er) outer beam of light, as shown above in FIGS. 2A-2C. In another embodiment, however, the interchangeable shadow-producing cover sheets may comprise an opaque portion (or semitransparent portion) surrounding a transparent portion (or semitransparent portion) to produce a light(er) object alone (or within a darker/colored outer beam of light), such as that shown in FIG. 3, which illustrates an example of a transposed shadow 200 in accordance with one or more embodiments of the present disclosure (e.g., showing light in the shape of a lightning bolt, rather than a shadow of the lightning bolt).

Figure 4:
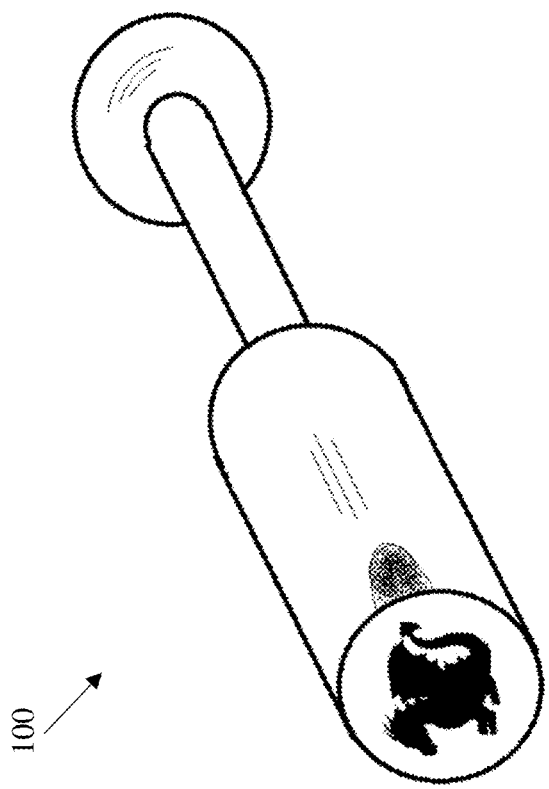
FIG. 4 illustrates another example of an interchangeable shadow sheet in accordance with one or more embodiments of the present disclosure.
Figure 4:
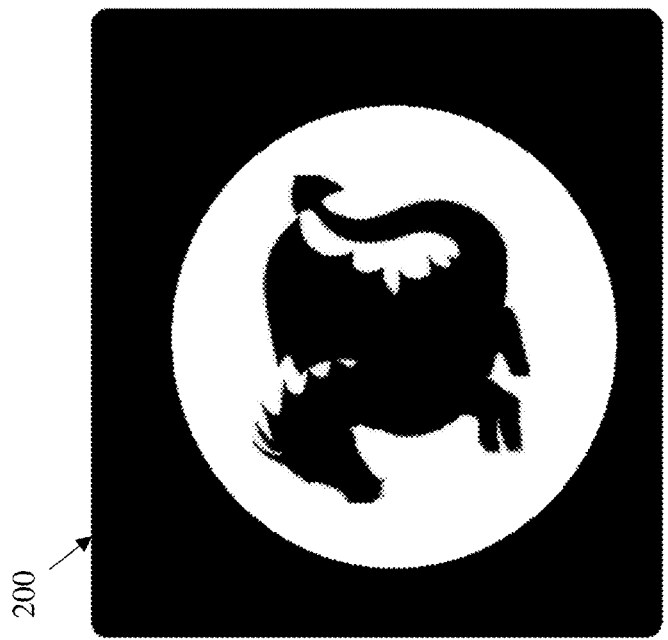

To demonstrate the interchangeability of the system 100 herein, FIG. 4 illustrates another example of an interchangeable shadow sheet 150 in accordance with one or more embodiments of the present disclosure, particularly in the shape of a shadow dragon (200).

Figure 5:
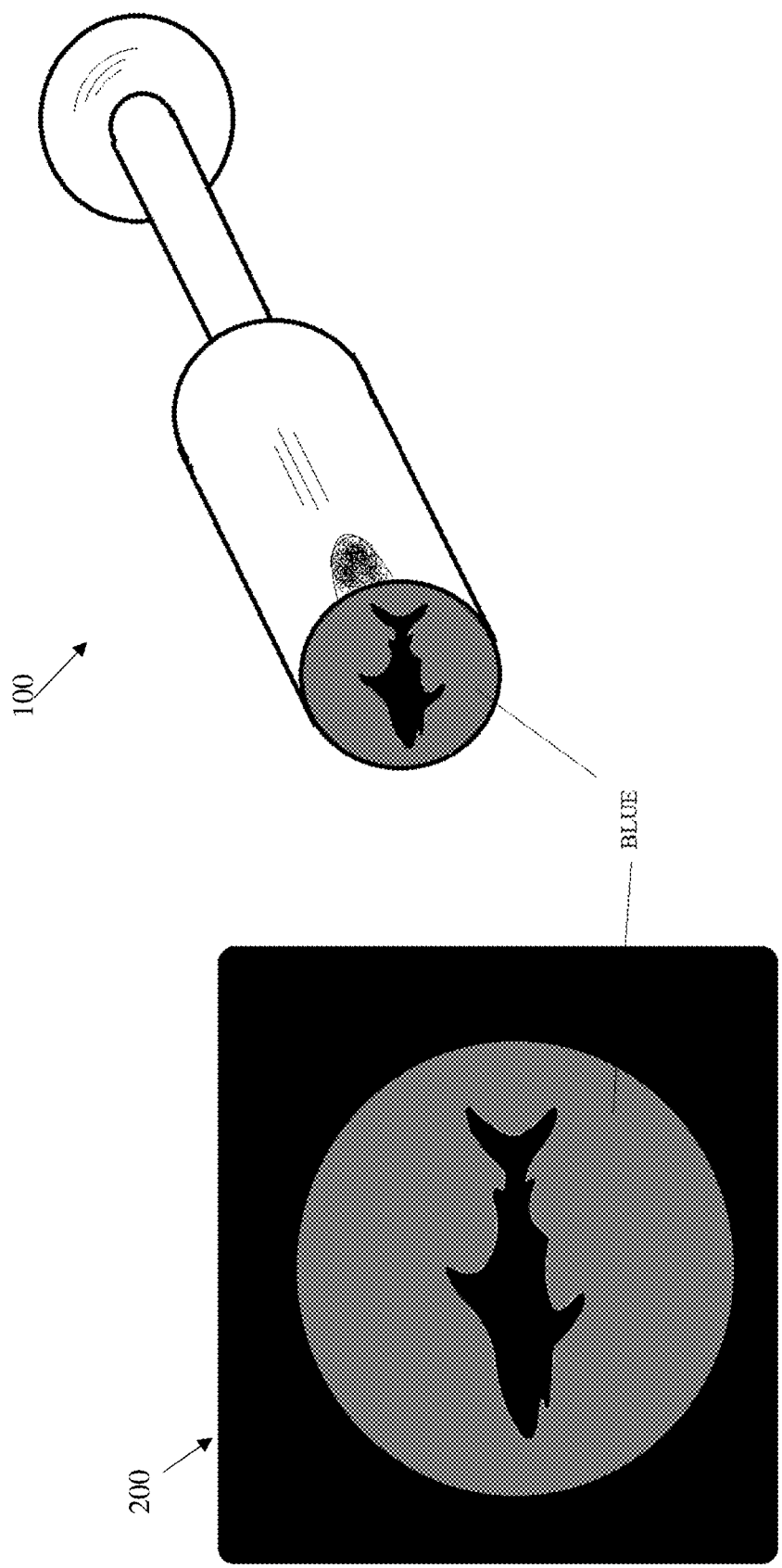
FIG. 5 illustrates an example of a colored semi-transparent sheet with an opaque shadow portion in accordance with one or more embodiments of the present disclosure.
Figure 6:
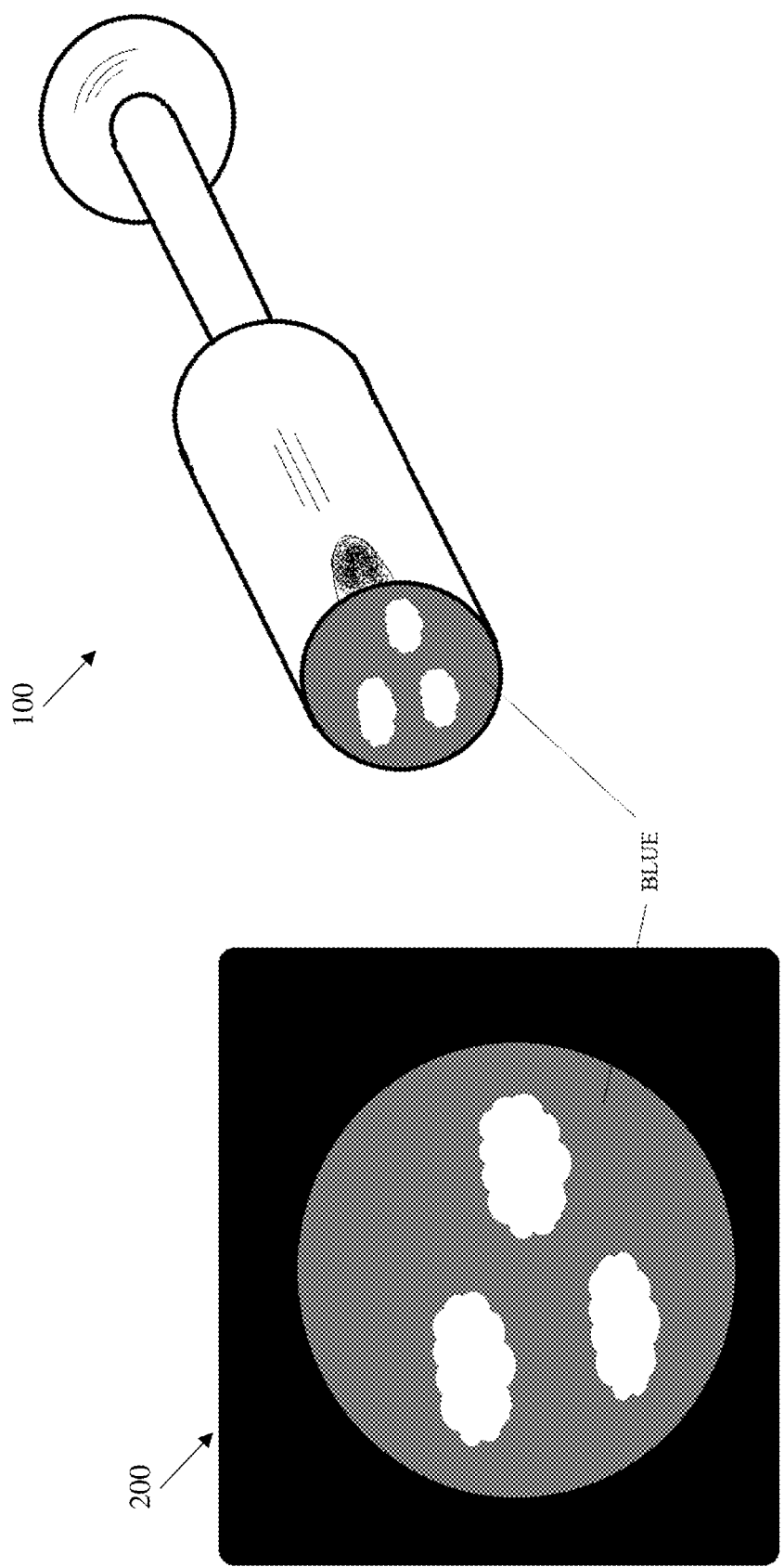
FIG. 6 illustrates another example of a colored semi-transparent sheet with a transparent light portion in accordance with one or more embodiments of the present disclosure.

In one embodiment herein, the interchangeable shadow-producing cover sheets may comprise one or more colored portions, such as to create colored shadows, as opposed to (or in addition to) dark shadows produced by opaque portions. The colored portions may be used with opaque portions to create a dark object within a colored light, or with transparent portions to create a colored object within a white light. For instance, FIG. 5 illustrates an example of a colored semi-transparent sheet 150 with an opaque shadow portion in accordance with one or more embodiments of the present disclosure (e.g., an opaque shark and blue background, resulting in a black shark shadow in a blue sea as shadow 200). On the other hand, FIG. 6 illustrates another example of a colored semi-transparent sheet 150 with a transparent light portion in accordance with one or more embodiments of the present disclosure (e.g., white clouds of light being emitted through transparent portions of an otherwise blue sheet as shadow 200). Note that the color "white", particularly where the objects are white and not the background, may be produced by holes in the sheet, rather than an actual transparent material. In other words, the "transparent portion" of a sheet, in certain instances where it is structurally supported, may be an aperture/air.

Figure 7:
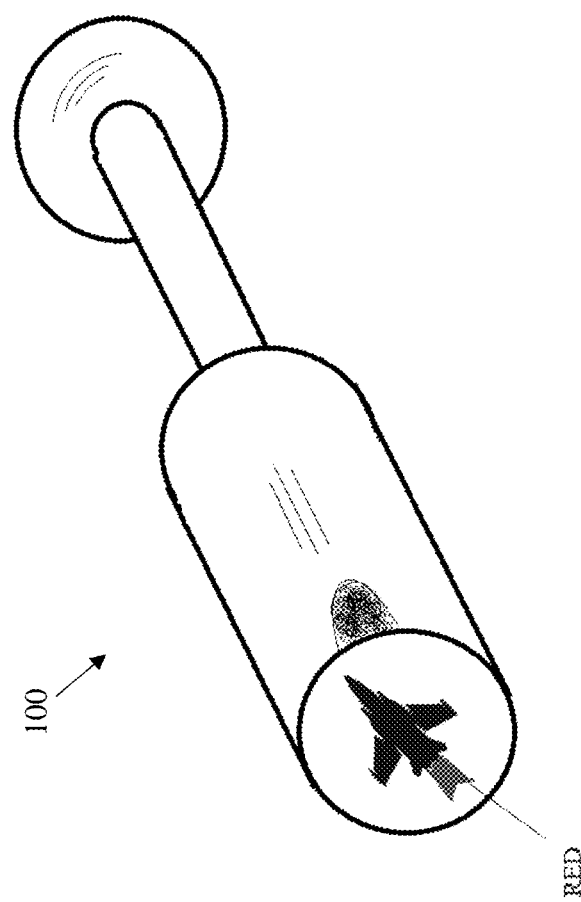
FIG. 7 illustrates an example of a shadow-making sheet with transparent, opaque, and colored semi-transparent portions in accordance with one or more embodiments of the present disclosure.
Figure 7:
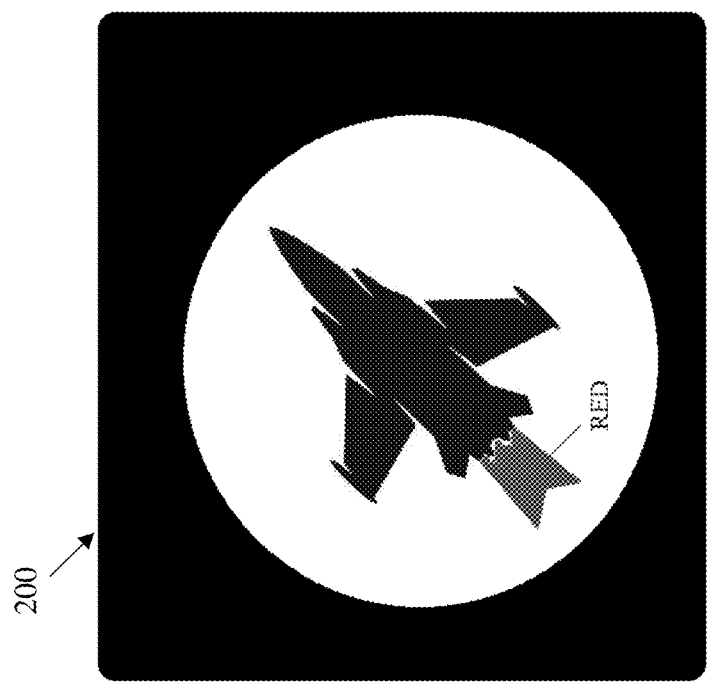

Various other combinations are also possible, including multi-colored sheets, partially colored sheets, and so forth. For example, FIG. 7 illustrates an example of a shadow-making sheet 150 with transparent, opaque, and colored semi-transparent portions in accordance with one or more embodiments of the present disclosure, where an opaque jet on a clear background shows red flames coming from the engines for shadow 200.

Figure 8:
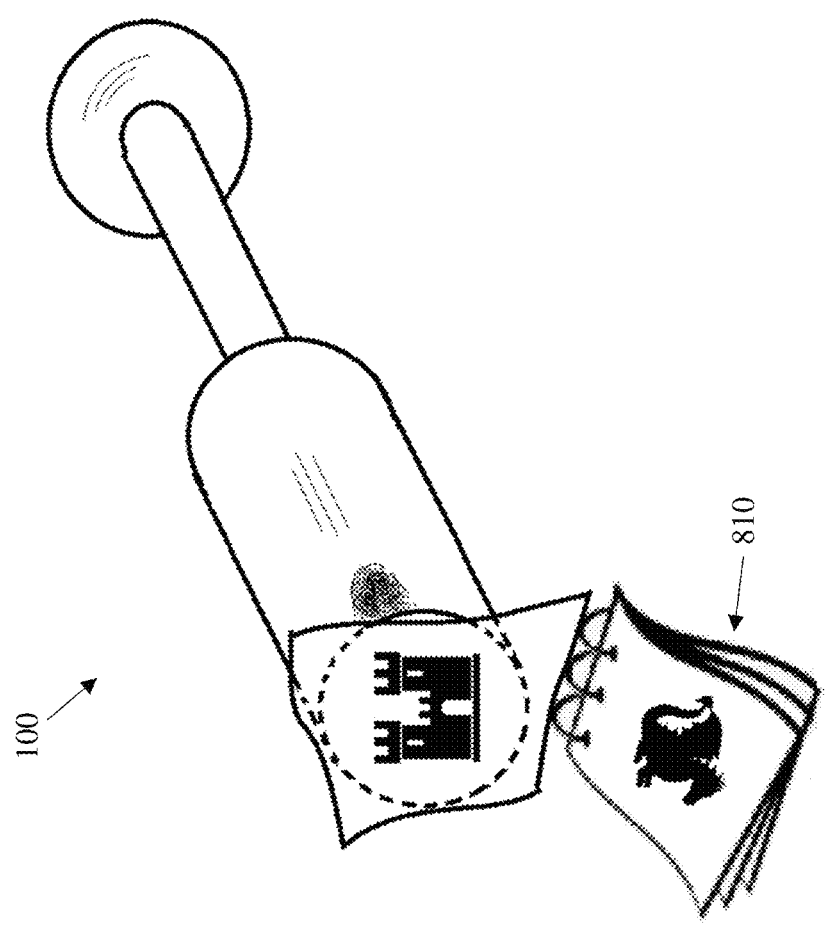
FIG. 8 illustrates an example of a shadow-making sheet booklet in accordance with one or more embodiments of the present disclosure.
Figure 8:
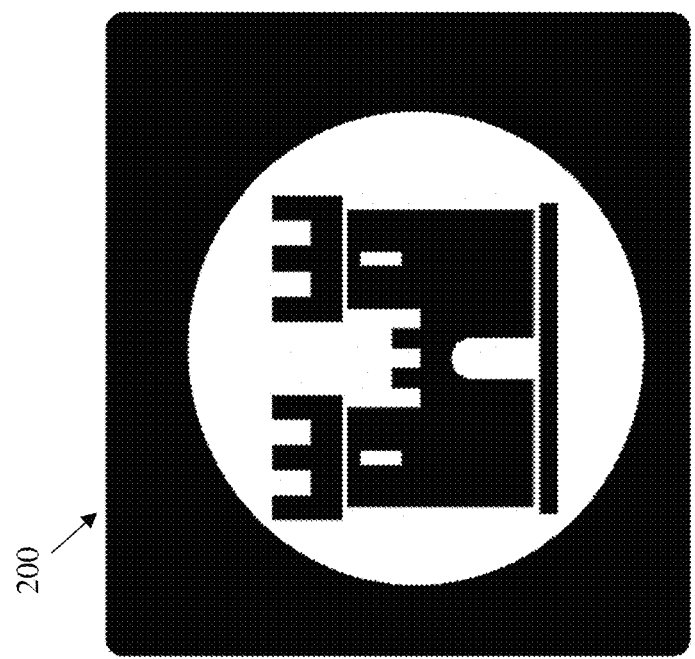

Further embodiments of the sheets are also contemplated herein, such as large sheets with multiple shadow-making options (where aiming the light through different selected portions results in a corresponding shadow image), as well as a shadow-making sheet booklet, such as the booklet 810 illustrated in FIG. 8 to produce the shadows 200, accordingly (e.g., a castle, a dragon, and so on, which may be a standalone book of shadows, or may correspond to, or be a part of, an associated storybook). Note that in the scope of the present disclosure, the booklet 810 may have removeable sheets with fasteners, or may have fasteners on non-removable sheets, to ensure secure connection of the shadow making sheet to the end of the flashlight tube. This embodiment is particularly useful for bedtime stories and associated shadow play.

Figure 9:
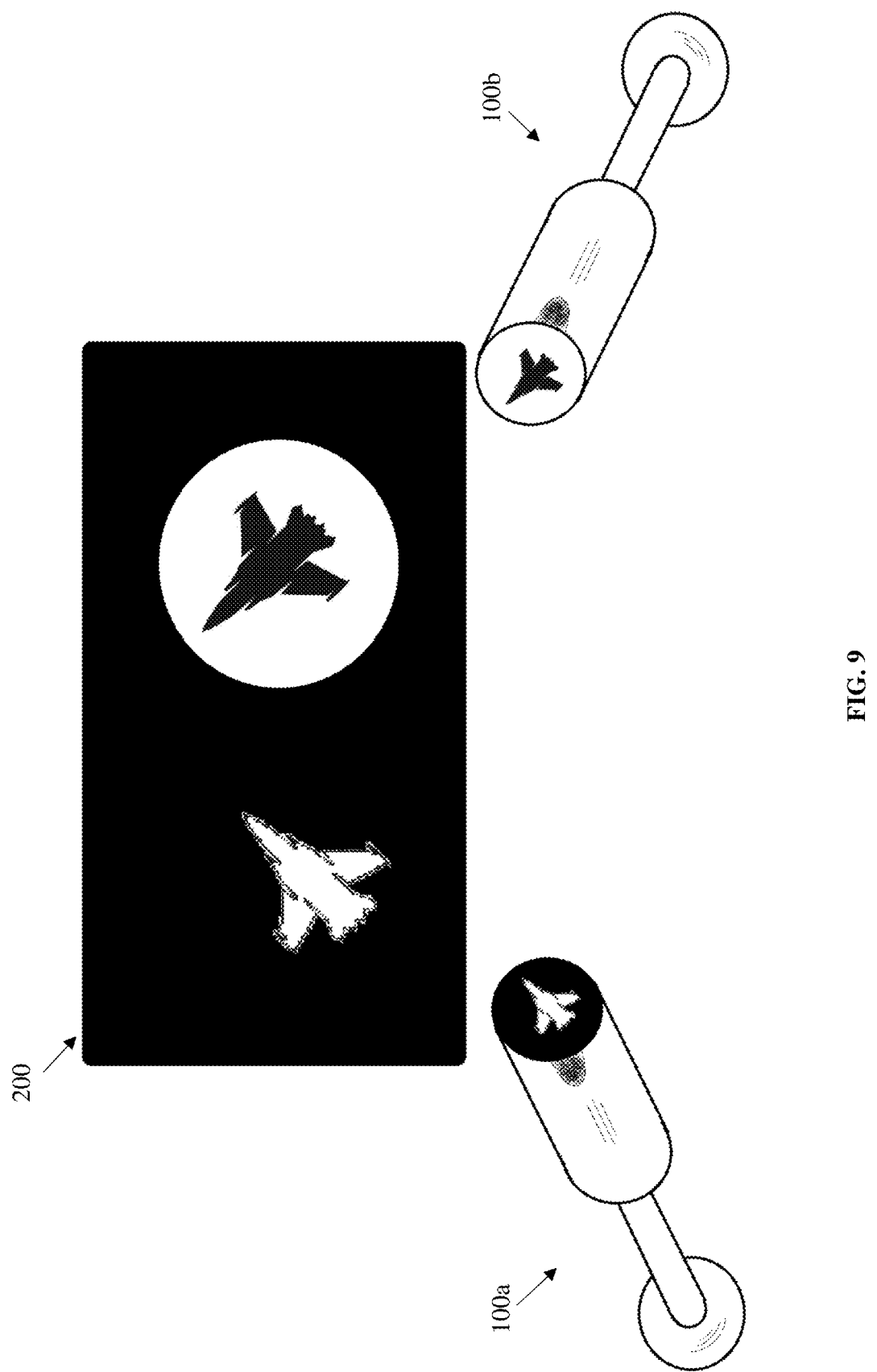
FIG. 9 illustrates an example of using a plurality of interchangeable shadow making flashlight systems in accordance with one or more embodiments of the present disclosure.

Note that with regard to shadow play, a plurality of interchangeable shadow making flashlight systems may be used in accordance with one or more embodiments of the present disclosure. For example, as shown in FIG. 9, multiple systems (100a and 100b) may be used to create a jet fight, between shadow jets, light jets, or, as shown, one shadow jet and one light jet as the shadow 200. Other options, such as race cars, castles and dragons, sharks eating fish, and so on, can be configured to allow free-play, or play that specifically goes along with a corresponding story (e.g., a fairy tale story, such as knights and princesses, dragons, etc.).

Figure 10:
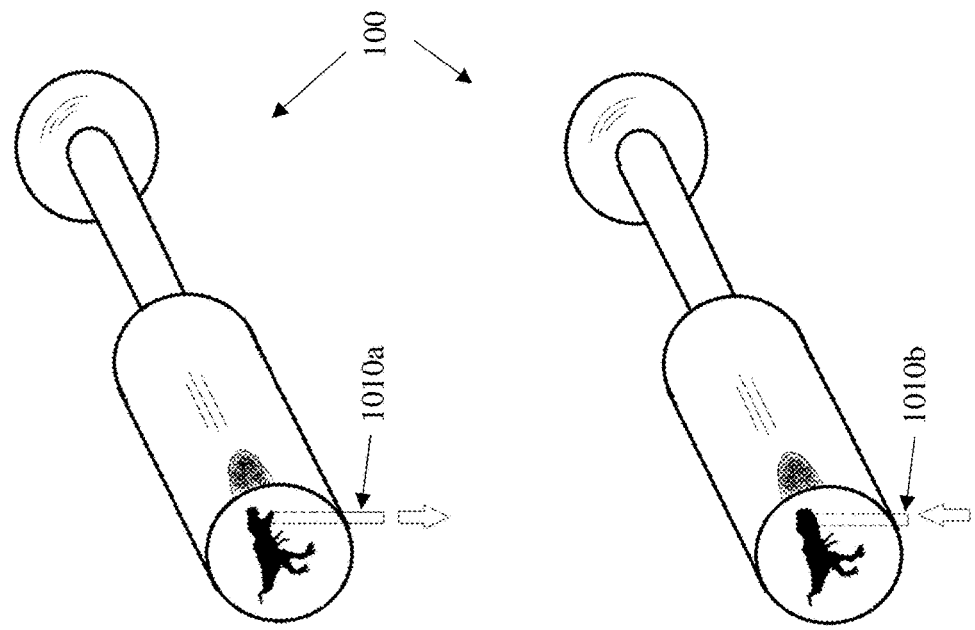
FIG. 10 illustrates an example of motion effects using a dynamic shadow making sheet in accordance with one or more embodiments of the present disclosure.
Figure 10:
Figure 10:

Still other embodiments may exist herein, particularly with regard to the options of the shadow making sheets, such as options for overlapping sheets (e.g., additional fasteners on the tube to allow multiple sheets to be affixed thereto, to create new shadow designs based on multiple separate sheets, including colors, more opaque areas, and so on), as well as more advanced options such as moveable shadows. For instance, FIG. 10 illustrates an example of motion effects using a dynamic shadow making sheet 150 in accordance with one or more embodiments of the present disclosure, where a moveable portion 1010 (e.g., a transparent push rod affixed to an opaque portion) creates desired motion effects, accordingly. As shown, for example, a dinosaur's jaw may be moveable (e.g., hinged, pivotable, sliding, etc.) and attached to a control mechanism as shown, to produce a "jaw chomping" effect with the shadow of the dinosaur (e.g., alternating between positions 1010a and 1010b). Other moveable components may be used, such as flapping wings, fire breathing dragons (e.g., red fire appearing from a dragon's mouth), and so forth would be possible with this configuration of the sheets.

Figure 11:
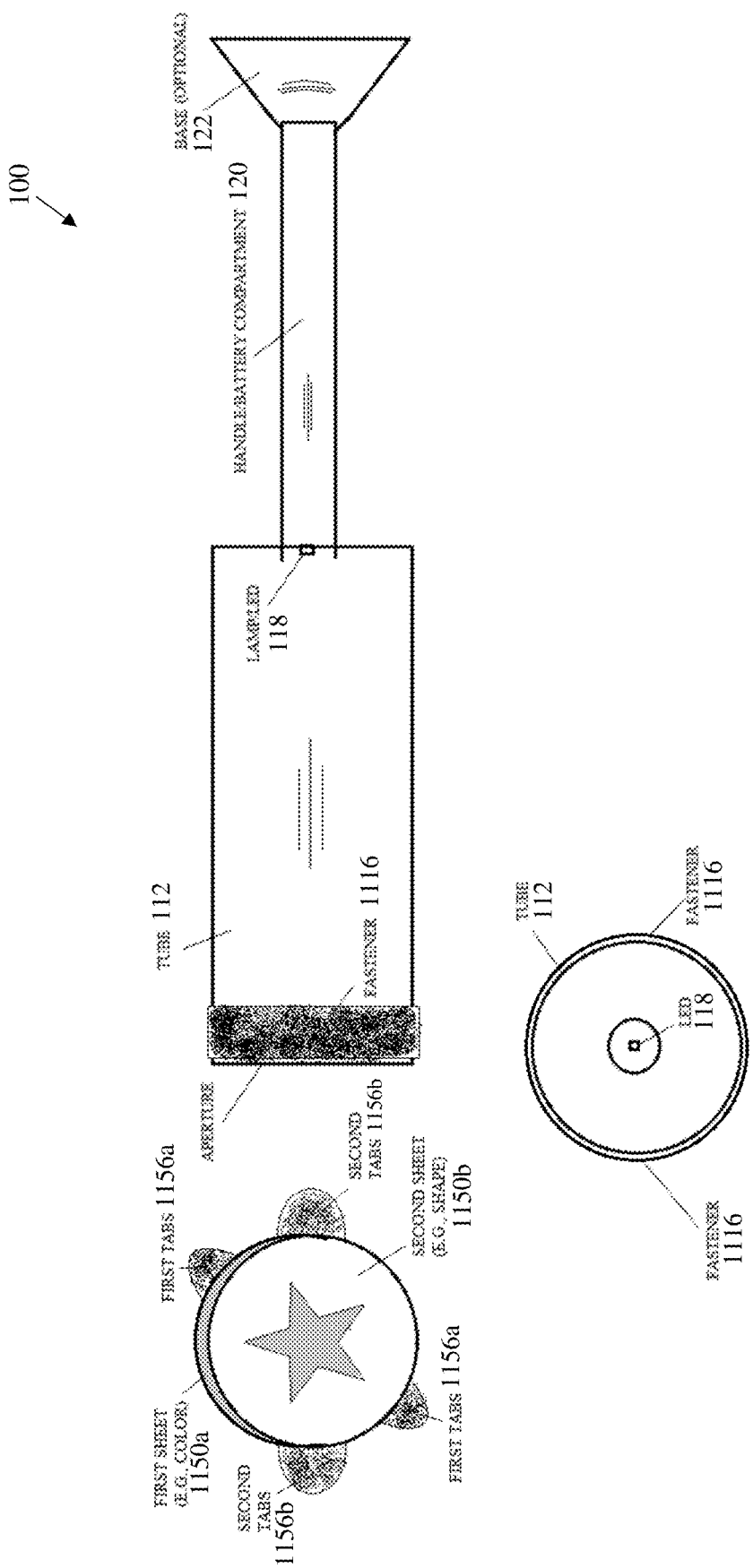
FIG. 11 illustrates an example alternative of the fastening mechanism arrangement for the interchangeable shadow making flashlight system in accordance with one or more embodiments of the present disclosure.

Furthermore, as shown in FIG. 11, alternate arrangements of the fastening mechanism 1116 may be configured for system 100, such as completely surrounding the tube 112 as shown, in addition to multi-level fasteners, a plurality of fasteners, etc., particularly to allow a plurality of shadow-producing cover sheets 1150a, 1150b, etc., to be stacked on top of each other by altering the location of the corresponding fastener tabs 1156a, 1156b, etc., of the sheets, accordingly.

In closing, the techniques described herein thus advantageously provide for an interchangeable shadow making flashlight system, particularly that allows for simple play of countlessly possible shadow shapes and games, limited only by imagination. In particular, the system herein is easy to use, particularly for smaller children or for people with disabilities, and provides the availability of a plethora of different shadow-based designs, rather than the limited number of sometimes difficult hand-made shadow puppets (e.g., the traditional dog, bird, snake, rabbit, etc.). The system herein also provides both the light source and the shadow source, thus making it portable, allowing shadow play anywhere there's darkness and a projection surface. The system herein is also easy for small children to use alone, such as during bedtime, without having to leave a lamp on in the room (e.g., the child can stay in bed and play with the lights/shadows without having to leave the bed to turn off their light once they are finally tired enough to sleep).

According to the present disclosure, an illustrative interchangeable shadow making flashlight system herein may thus comprise: a flashlight having light source located at a light-emitting end and a power source for the light source; a tube extending from the light-emitting end of the flashlight, the tube forming an aperture at a distal end; a first fastening mechanism located at the distal end of the tube; and a plurality of interchangeable shadow-producing cover sheets having at least first and second portions and a second fastening mechanism configured to fasten in conjunction with the first fastening mechanism, wherein the at least first and second portions are configured such that light emitted by the light source and passing through the tube is affected differently by each of the at least first and second portions to create a corresponding shadow-based image on a receiving projection surface.

In one embodiment, the at least first and second portions comprise an opaque portion and a transparent portion.

In one embodiment, the at least first and second portions are selected from a group consisting of: an opaque portion; a transparent portion; a semitransparent portion; and a semitransparent colored portion.

In one embodiment, the at least first and second portions are configured with a transparent portion surrounding an opaque portion to produce a shadow object corresponding to the opaque portion within an outer beam of light.

In one embodiment, the at least first and second portions are configured with a semitransparent colored portion surrounding an opaque portion to produce a shadow object corresponding to the opaque portion within a colored outer beam of light.

In one embodiment, the at least first and second portions are configured with a transparent portion surrounding a semitransparent colored portion to produce a colored inner object corresponding to the semitransparent colored portion within an outer beam of light.

In one embodiment, the at least first and second portions are configured with an opaque portion surrounding a transparent portion to produce a light object corresponding to the transparent portion within a shadow of the opaque portion.

In one embodiment, the at least first and second portions are configured with an opaque portion surrounding a semitransparent colored portion to produce a colored light object corresponding to the semitransparent colored portion within a shadow of the opaque portion.

In one embodiment, the at least first and second portions are configured with a semitransparent portion surrounding a transparent portion to produce a light object corresponding to the transparent portion within a colored outer beam of light.

In one embodiment, the plurality of interchangeable shadow-producing cover sheets each have at least first and second portions that are configured in a specific corresponding shape.

In one embodiment, the light source comprises a single light emitting diode and does not include a reflector, thereby causing a single non-refracting beam of light to pass through the tube.

In one embodiment, a length of the tube is configured to place a fastened shadow-producing cover sheet at an optimal focal length from the light source.

In one embodiment, a length of the tube is configured to limit enlarging of the corresponding shadow-based image based on distance from the light source to the receiving projection surface.

In one embodiment, the interchangeable shadow making flashlight system further comprises: a stand base configured to allow the flashlight to free-stand on a horizontal surface. In one embodiment, the stand base comprises one or more features configured to prevent rolling of the flashlight. In one embodiment, the interchangeable shadow making flashlight system further comprises: an on/off switch on an end of the flashlight distal to the light source and within the stand base.

In one embodiment, the plurality of interchangeable shadow-producing cover sheets are configured as an attached booklet.

In one embodiment, at least one of the plurality of interchangeable shadow-producing cover sheets has at least one moveable portion.

In one embodiment, the first fastening mechanism and second fastening mechanism are selected collectively from a group consisting of: hook and loop fasteners; buttons; snaps; threads; magnets and magnetic materials; adhesives and adhering materials; slots and inserts; and mating compressive outer portions and receiving inner portions.

In one embodiment, the first fastening mechanism completely surrounds the distal end of the tube.

While there have been shown and described illustrative embodiments, it is to be understood that various other adaptations and modifications may be made within the scope of the embodiments herein. For example, while certain shapes, sizes, materials, components, etc. have been specifically mentioned above, those skilled in the art will recognize that the interchangeable shadow making flashlight system described herein is not so limited, and that other designs, pieces, materials, etc. may be used in accordance with the techniques described herein, and those specifically mentioned are merely examples not meant to limit the scope of the present disclosure. Also, while certain shadow examples have been illustrated herein, any shapes may be used as appropriate, accordingly.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

The foregoing description has been directed to specific embodiments. It will be apparent, however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. An interchangeable shadow making flashlight system, comprising:
    a flashlight having a single light source located at a light-emitting end and a power source for the single light source, wherein the single light source does not include a reflector;
    a tube of a length extending from the light-emitting end of the flashlight, the tube forming an aperture at a distal end, wherein the single light source causes a single non-refracting beam of light to pass through the tube;
    a first fastening mechanism located at the distal end of the tube; and
    a plurality of interchangeable shadow-producing cover sheets having at least first and second portions and a second fastening mechanism configured to fasten in conjunction with the first fastening mechanism, wherein the at least first and second portions are configured such that light emitted by the single light source and passing through the tube is affected differently by each of the at least first and second portions to create a corresponding shadow-based image on a receiving projection surface, wherein the length of the tube is configured to:

enable fastening of a fastened shadow-producing cover sheet at an optimal focal length from the single light source, and limit enlarging of the corresponding shadow-based image based on distance from the single light source to the receiving projection surface.

2. The interchangeable shadow making flashlight system as in claim 1, wherein the at least first and second portions comprise an opaque portion and a transparent portion.

3. The interchangeable shadow making flashlight system as in claim 1, wherein the at least first and second portions are selected from a group consisting of: an opaque portion; a transparent portion; a semitransparent portion; and a semitransparent colored portion.

4. The interchangeable shadow making flashlight system as in claim 1, wherein the at least first and second portions are configured with a transparent portion surrounding an opaque portion to produce a shadow object corresponding to the opaque portion within an outer beam of light.

5. The interchangeable shadow making flashlight system as in claim 1, wherein the at least first and second portions are configured with a semitransparent colored portion surrounding an opaque portion to produce a shadow object corresponding to the opaque portion within a colored outer beam of light.

6. The interchangeable shadow making flashlight system as in claim 1, wherein the at least first and second portions are configured with a transparent portion surrounding a semitransparent colored portion to produce a colored inner object corresponding to the semitransparent colored portion within an outer beam of light.

7. The interchangeable shadow making flashlight system as in claim 1, wherein the at least first and second portions are configured with an opaque portion surrounding a transparent portion to produce a light object corresponding to the transparent portion within a shadow of the opaque portion.

8. The interchangeable shadow making flashlight system as in claim 1, wherein the at least first and second portions are configured with an opaque portion surrounding a semitransparent colored portion to produce a colored light object corresponding to the semitransparent colored portion within a shadow of the opaque portion.

9. The interchangeable shadow making flashlight system as in claim 1, wherein the at least first and second portions are configured with a semitransparent portion surrounding a transparent portion to produce a light object corresponding to the transparent portion within a colored outer beam of light.

10. The interchangeable shadow making flashlight system as in claim 1, wherein the plurality of interchangeable shadow-producing cover sheets each have at least first and second portions that are configured in a specific corresponding shape.

11. The interchangeable shadow making flashlight system as in claim 1, wherein the single light source comprises a single light emitting diode.

12. The interchangeable shadow making flashlight system as in claim 1, further comprising:

a stand base configured to allow the flashlight to free-stand on a horizontal surface.

13. The interchangeable shadow making flashlight system as in claim 12, wherein the stand base comprises one or more features configured to prevent rolling of the flashlight.

14. The interchangeable shadow making flashlight system as in claim 12, further comprising: an on/off switch on an end of the flashlight distal to the single light source and within the stand base.

15. The interchangeable shadow making flashlight system as in claim 1, wherein the plurality of interchangeable shadow-producing cover sheets are configured as an attached booklet.

16. The interchangeable shadow making flashlight system as in claim 1, wherein at least one of the plurality of interchangeable shadow-producing cover sheets has at least one moveable portion.

17. The interchangeable shadow making flashlight system as in claim 1, wherein the first fastening mechanism and second fastening mechanism are selected collectively from a group consisting of: hook and loop fasteners; buttons; snaps; threads; magnets and magnetic materials; adhesives and adhering materials; slots and inserts; and mating compressive outer portions and receiving inner portions.

18. The interchangeable shadow making flashlight system as in claim 1, wherein the first fastening mechanism completely surrounds the distal end of the tube.

* * * * *